(12) United States Patent
Chen et al.

(10) Patent No.: US 10,459,632 B1
(45) Date of Patent: Oct. 29, 2019

(54) METHOD AND SYSTEM FOR AUTOMATIC REPLICATION DATA VERIFICATION AND RECOVERY

(71) Applicant: EMC IP Holding Company LLC, Hopkinton, MA (US)

(72) Inventors: Xiangping Chen, Sherborn, MA (US); David Meiri, Cambridge, MA (US); William R. Stronge, Westford, MA (US); Felix Shvaiger, Brighton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 455 days.

(21) Appl. No.: 15/267,949

(22) Filed: Sep. 16, 2016

(51) Int. Cl.
  *G06F 11/00* (2006.01)
  *G06F 3/06* (2006.01)
  *G06F 11/14* (2006.01)

(52) U.S. Cl.
  CPC ............ *G06F 3/0607* (2013.01); *G06F 3/065* (2013.01); *G06F 3/067* (2013.01); *G06F 3/0616* (2013.01); *G06F 3/0619* (2013.01); *G06F 11/1464* (2013.01); *G06F 11/1469* (2013.01); *G06F 2201/805* (2013.01); *G06F 2201/84* (2013.01)

(58) Field of Classification Search
  CPC ......... G06F 17/30138; G06F 17/30371; G06F 17/30578; G06F 11/1451; G06F 11/1469; G06F 11/1464; G06F 11/1612; Y10S 707/99953; Y10S 707/99955
  See application file for complete search history.

(56) References Cited

U.S. PATENT DOCUMENTS

| | | | | |
|---|---|---|---|---|
| 5,592,618 A * | 1/1997 | Micka | ................. | G06F 11/2074 711/162 |
| 5,668,943 A * | 9/1997 | Attanasio | ............ | G06F 11/2033 714/15 |
| 6,237,008 B1 * | 5/2001 | Beal | ...................... | G06F 3/0619 |
| 6,289,335 B1 * | 9/2001 | Downing | .......... | G06F 17/30309 707/769 |
| 6,434,681 B1 * | 8/2002 | Armangau | .......... | G06F 11/1466 711/162 |
| 7,111,026 B2 * | 9/2006 | Sato | .................. | G06F 17/30008 |
| 7,308,545 B1 * | 12/2007 | Kekre | ................. | G06F 11/2097 707/999.202 |
| 7,568,080 B2 * | 7/2009 | Prahlad | ............... | G06F 11/1451 707/999.202 |

(Continued)

OTHER PUBLICATIONS

U.S. Appl. No. 14/755,384, filed Jul. 15, 2015 and entitled "Asynchronous Replication Cycles."

*Primary Examiner* — Bryce P Bonzo
*Assistant Examiner* — Jeison C Arcos
(74) *Attorney, Agent, or Firm* — Ryan, Mason & Lewis, LLP

(57) ABSTRACT

Example embodiments of the present invention relate to methods, systems, and a computer program product for performing asynchronous replication of a snapshot. The method includes assigning a unique identifier to a snapshot at a source node in a data storage system. Asynchronous replication of the snapshot, including the unique identifier, then may be performed from the source node to a target node. Integrity of the replicated snapshot having the unique identifier then may be verified at the target node.

21 Claims, 4 Drawing Sheets

(56) References Cited

U.S. PATENT DOCUMENTS

| | | | |
|---|---|---|---|
| 7,769,722 B1* | 8/2010 | Bergant | G06F 17/30212 707/681 |
| 8,700,871 B2* | 4/2014 | Saika | G06F 3/0604 707/610 |
| 8,706,833 B1* | 4/2014 | Bergant | G06F 17/30215 709/214 |
| 9,047,189 B1* | 6/2015 | Gupta | G06F 11/10 |
| 9,141,290 B2 | 9/2015 | Hallak et al. | |
| 9,286,003 B1 | 3/2016 | Hallak et al. | |
| 9,378,106 B1 | 6/2016 | Ben-Moshe et al. | |
| 9,740,700 B1* | 8/2017 | Chopra | G06F 16/128 |
| 9,767,106 B1* | 9/2017 | Duggal | G06F 11/14 |
| 9,898,369 B1* | 2/2018 | Moghe | G06F 11/1451 |
| 9,910,620 B1 | 3/2018 | Veprinsky et al. | |
| 2003/0182325 A1* | 9/2003 | Manley | G06F 11/2066 |
| 2003/0195903 A1* | 10/2003 | Manley | G06F 11/2066 |
| 2004/0093474 A1* | 5/2004 | Lin | G06F 17/30138 711/162 |
| 2004/0117572 A1* | 6/2004 | Welsh | G06F 11/1451 711/162 |
| 2004/0148477 A1* | 7/2004 | Cochran | G06F 3/0601 711/162 |
| 2004/0158588 A1* | 8/2004 | Pruet, III | G06F 17/30578 |
| 2004/0186900 A1* | 9/2004 | Nakano | G06F 17/30067 709/213 |
| 2005/0192989 A1* | 9/2005 | Adiba | G06F 17/30371 |
| 2005/0256972 A1* | 11/2005 | Cochran | G06F 11/2071 709/245 |
| 2006/0155946 A1* | 7/2006 | Ji | G06F 3/0617 711/162 |
| 2006/0179261 A1* | 8/2006 | Rajan | G06F 17/30067 711/162 |
| 2006/0184587 A1* | 8/2006 | Federwisch | G06F 11/1451 |
| 2006/0224639 A1* | 10/2006 | Watanabe | G06F 11/2097 |
| 2006/0242179 A1* | 10/2006 | Chen | G06F 3/0605 |
| 2007/0179994 A1* | 8/2007 | Deguchi | G06F 11/1471 |
| 2007/0192553 A1* | 8/2007 | Otani | G06F 11/1456 711/162 |
| 2008/0046432 A1* | 2/2008 | Anderson | G06F 17/30088 |
| 2009/0055607 A1* | 2/2009 | Schack | G06F 11/1435 711/162 |
| 2009/0077097 A1* | 3/2009 | Lacapra | G06F 17/30079 |
| 2009/0106255 A1* | 4/2009 | Lacapra | G06F 11/1076 |
| 2009/0222498 A1* | 9/2009 | Lu | G06F 16/10 |
| 2010/0211547 A1* | 8/2010 | Kamei | G06F 11/1451 707/649 |
| 2012/0123999 A1* | 5/2012 | Ashutosh | G06F 11/1453 707/618 |
| 2012/0324236 A1* | 12/2012 | Srivastava | G06F 21/57 713/189 |
| 2013/0212709 A1* | 8/2013 | Tucker | G06F 21/55 726/29 |
| 2013/0325824 A1* | 12/2013 | Shoens | G06F 17/30115 707/698 |
| 2014/0181016 A1* | 6/2014 | Whitehead | G06F 11/00 707/613 |
| 2014/0181027 A1* | 6/2014 | Whitehead | G06F 17/30174 707/639 |
| 2014/0201150 A1* | 7/2014 | Kumarasamy | G06F 11/1451 707/639 |
| 2014/0279909 A1* | 9/2014 | Sudarsanam | G06F 9/45558 707/639 |
| 2015/0135321 A1* | 5/2015 | Gayler | G06F 21/562 726/24 |
| 2015/0212893 A1* | 7/2015 | Pawar | G06F 16/128 707/649 |
| 2015/0212895 A1* | 7/2015 | Pawar | G06F 16/128 707/649 |
| 2016/0048408 A1* | 2/2016 | Madhu | G06F 11/1458 718/1 |
| 2016/0202927 A1* | 7/2016 | Klarakis | G06F 3/0619 709/217 |
| 2016/0371007 A1* | 12/2016 | Shani | G06F 3/065 |

* cited by examiner

US 10,459,632 B1

METHOD AND SYSTEM FOR AUTOMATIC REPLICATION DATA VERIFICATION AND RECOVERY

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

SUMMARY

Example embodiments of the present invention relate to methods, systems, and a computer program product for performing asynchronous replication of a snapshot. The method includes assigning a unique identifier to a snapshot at a source node in a data storage system. Asynchronous replication of the snapshot, including the unique identifier, then may be performed from the source node to a target node. Integrity of the replicated snapshot having the unique identifier then may be verified at the target node.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
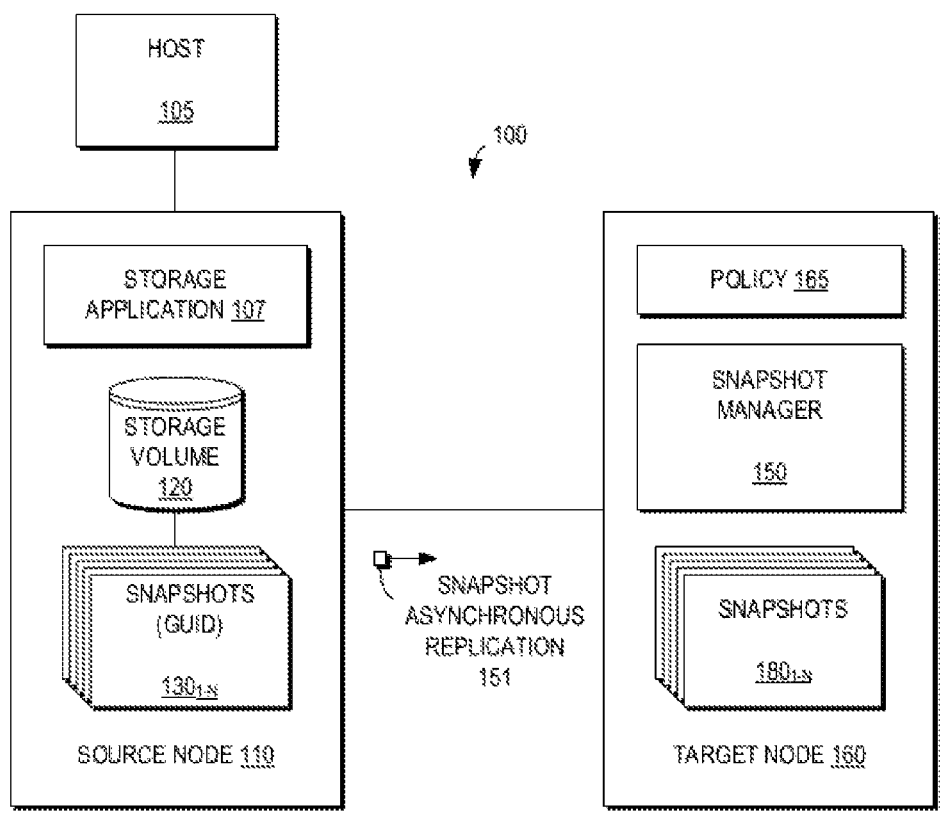
FIG. 1 is a block diagram illustrating a system for performing asynchronous replication data verification according to an example embodiment of the present invention.

In general, many data storage systems, and especially primary storage solutions, rely on address-based mapping of data, as well as address-based functionality of the storage system's internal algorithms. However, a different scheme in which data, internally within the storage system, is mapped and managed based on its content instead of its address, has many substantial advantages. For example, it improves storage capacity efficiency since any duplicate block data will only occupy actual capacity of a single instance of that block. As another example, it improves performance since duplicate block writes do not need to be executed internally in the storage system.

Traditional storage systems (e.g., primary storage systems or archiving storage systems) may be incapable of supporting the combination of content based storage (with its numerous advantages) and ultra-high performance. This is a result of the fact that the implementation of a content based storage scheme may face several challenges:

(a) intensive computational load which is not easily distributable or breakable into smaller tasks;

(b) an inherent need to break large blocks into smaller block sizes, which dramatically degrades the performance of existing storage solutions, in order to achieve content addressing at fine granularity;

(c) inability to maintain sequential location of data blocks within the storage systems, since mapping is not address based any more, and such inability causes dramatic performance degradation with traditional spinning disk systems; and (d) the algorithmic and architectural difficulty in distributing the tasks associated with content based mapping over a large number of processing and storage elements while maintaining single content-addressing space over the full capacity range of the storage system.

Examples Example embodiments of the present invention include a networked memory system which may include multiple memory storage units arranged for content addressable storage of data. The design may be based on a distributed architecture, where computational, Storage Area Networking (SAN), and storage elements are distributed over multiple physical nodes, with nodes being interconnected over an internal network through a switch device. The distributed architecture enables the scaling of the system's capabilities in multiple aspects, including overall storage capacity, performance characteristics in bandwidth and I/O operations per second (IOPS), computational resources, internal and external networking bandwidth, etc. However, while being based on a distributed architecture, the system presents, externally, a unified storage system entity with scalable capabilities.

In example embodiments of the present invention, the system's architecture and internal algorithms implementing the storage functions may be optimized for improved utilization of the capabilities of random-access memory/storage media, as opposed to and in contrast with mechanical-magnetic spinning disk storage media. For example, example embodiments of the present invention may employ more than a single type of memory technology, including a mix of more than one Flash technology (e.g., single level cell (SLC) Flash and multilevel cell (MLC) Flash, and a mix of Flash and random-access memory media, including dynamic random-access memory (DRAM) or other memory technologies, whether persistent or non-persistent, and is typically characterized by random seek/access times and random read/write speeds substantially higher than those exhibited by spinning disk media. Such combinations of memory/storage technologies may provide further performance optimization, life span maximization, and cost optimization. For example, the data mapping may optimize performance and life span by taking advantage of the different access speeds and different write/erase cycle limitations of the various memory technologies. Moreover, certain optimizations or benefits of using Flash technology, such as inline deduplication and breaking incoming write operations into smaller blocks for distribution over a plurality of processing nodes, may be less suitable in a spinning-disk environment and may degrade storage system performance to extremely low levels.

In certain embodiments, data may be transferred to and from storage units using separate data and control planes. Separation of control and data may enable a substantially unlimited level of scalability because control operations can be split over any number of processing elements and data operations can be split over any number of data storage elements. Accordingly, in such embodiments, this allows scalability in both capacity and performance, and may thus permit an operation to be effectively balanced between the different modules and nodes.

In example embodiments of the present invention, the separation of control and data may also help to speed the operation of the system; that is to say it may speed up writes and reads due to, for example, (a) parallel operation of certain control and data actions over multiple nodes/modules; and (b) use of optimal internal communication/networking technologies per the type of operation (e.g., control or data), designed to minimize the latency (i.e., delay) and maximize the throughput of each type of operation.

In other embodiments, separation of control and data paths may allow each control or data information unit to travel within the system between nodes or modules in an optimal way, meaning only to where it is needed and if/when it is needed. It should be understood that, in certain embodiments, the set of optimal where and when coordinates is not the same for control and data units and, hence, the separation of control and data paths ensures the optimization of such data and control movements in a way which is not otherwise possible. In certain embodiments, the separation is important in keeping the workloads and internal communications at the minimum necessary, and may translate into increased optimization of performance.

Content Addressable Storage

According to an example embodiment, a block-level Content Addressable Storage (CAS) array may store data in and access data from memory by assigning addresses to fixed size chunks (i.e., blocks) of data. In example embodiments of the present invention, a relatively small granularity may be used (e.g., 4 KB); however, it should be understood that smaller or larger block sizes may be selected at the discretion of one of ordinary skill in the art. The specific numbers for granularity can be set based on various design tradeoffs, and the specific number used herein of 4 KB is merely an example. This enables the device to detach the incoming user access pattern from the internal access pattern. That is to say the incoming user access pattern may be larger than the 4 KB or other system-determined page size and may thus be converted to a plurality of write operations within the system, each one separately hashed and separately stored.

Further, in example embodiments, each address may be a number in some range, and the range may indicate the amount of available memory to be written and read. In embodiments employing thin provisioning, the range of addresses can be much larger than the actual amount of available memory and the address to data mapping array can be viewed as a sparse array, where many addresses do not have a value, and the mapping can be viewed as being from logical user address to internal physical location.

Moreover, in example embodiments, hashing is used for the content addressing and, in a preferred embodiment, the hashing produces evenly distributed results over the allowed input range. In other words, in example embodiments of the present invention, hashing defines the physical addresses so that data storage makes even use of the system resources. For example, each block has a unique hash signature (e.g., 20B) saved in memory (e.g., Flash). Therefore, the granularity enables the storage array to detach the incoming user access pattern from the internal access pattern; that is to say the incoming user access pattern may be larger than the granularity (e.g., 4 KB) or other system-determined page size and may thus be converted to a plurality of write operations within the system, each one separately hashed and separately stored.

In some embodiments employing data deduplication, identical chunks of data may appear under different addresses. In such embodiments, to avoid holding two or more duplicate copies of the same data chunk (i.e., deduplication), another layer of indirection may be introduced and, instead of mapping multiple addresses to the same chunk of data, one can map addresses to much shorter hash digests of typically a few bytes, representing the 4 KB data chunks, and further map these hash digests to the internal physical location according to the actual data they represent. Accordingly, this scheme maps blocks of data internally according to their content, resulting in mapping of identical blocks to the same unique internal location.

In example embodiments of the present invention, content addressable data storage can be used to ensure that data appearing twice is stored at the same location. Hence, in a preferred embodiment, unnecessary duplicate write operations can be identified and avoided. In some embodiments, such a feature may be included in the present system as data deduplication. Data mapping within the system of example embodiments of the present invention is designed not only to improve performance, but also to improve the life span and reliability of the electronic memory media, in cases where the memory technology used has limitations on write/erase cycles, as is the case with Flash memory. Lifetime maximization may be achieved by avoiding unnecessary write operations as will be explained in greater detail below.

The distributed CAS algorithm in example embodiments of the present invention allows for scaling of the CAS domain as overall system capacity grows, effectively utilizing and balancing the available computational and storage elements in order to improve overall system performance at any scale and with any number of computational and storage elements. The examples described herein may overcome the scalability challenge by providing data flow (i.e., write, read) that is distributed among an arbitrary and scalable number of physical and logical nodes. For example, embodiments distribute computation-intensive tasks (e.g., calculating cryptographic hash values), as well as metadata and its access, among an arbitrary number of nodes. Furthermore, data flow algorithms may partition read/write operations in an optimally-balanced way, over an arbitrary and scalable number of nodes, while guaranteeing consistency and inline deduplication effect over the complete storage space.

Snapshot Mechanism

To create virtual copies, example embodiments of the present invention create snapshots of the production data. For example, snapshots may be created as described in U.S. Pat. No. 9,141,290 entitled "SNAPSHOT MECHANISM" issued on Sep. 22, 2015, commonly assigned with the present application to EMC Corporation of Hopkinton, Mass., and incorporated herein by reference in its entirety. As understood in the art, and in certain embodiments of the present invention, a snapshot (i.e., zero time copy) provides an instantaneous copy of a logical volume and may be used for various purposes, including taking copies for backups across different points in time, as well as using multiple copies of a database for different uses (e.g., production, development, testing, different copies for different users, copies for users of virtual machines, disaster recovery, etc.). For example, in some embodiments, writable snapshots (i.e., clones) may be used in a virtualization infrastructure as multiple images of virtual machines. Likewise, in other embodiments, as described in greater detail below, snapshots may be used as the internal mechanism to implement asynchronous replication between storage arrays or local data protection.

Regarding creation and deletion of snapshots, there also may be various efficiency levels. Creation of snapshots, while instantaneous, may include prolonged asynchronous procedures which depend on the address space of the original volume or on the amount of data previously written to the original volume. For example, a snapshot may be taken of a specific address range at a point in time and provide a duplicate of the address range (i.e., fully provisioned or thinly provisioned) by inheriting the mappings of the address range and it may overwrite mappings and diverge from the source range or volume. Snapshot deletion efficiency is typically a function of the data and metadata efficiencies since all data and metadata is typically deleted. For example, in most cases, this requires going over metadata in accordance with the address space of the snapshot or even the aggregated address space of all snapshots of the ancestor volume. Often, a prolonged snapshot deletion process delays the creation of new snapshots, due to a limit on the number of snapshots or a limit on the amount of space available. This delay may significantly increase the Recovery Point Objective (RPO) when using snapshots to implement asynchronous replication.

Snapshot-Based Replication

Traditionally, many distributed systems use a consistent snapshot mechanism to replicate data between a source site and a target site. Typically, replication using a consistent snapshot mechanism is limited by the speed at which a storage system is able to complete replication cycles. Improvements to conventional replication using a consistent snapshot mechanism would be beneficial to the data storage industry.

Typically, a consistent snapshot is created from data within a storage system from one or more sources at the beginning of a replication cycle. Generally, once the data changes, those changes are transferred to a target site. Conventionally, upon completion of the data transfer, a snapshot is created at the target site which contains the same data as the snapshot(s) resident at the source site(s), thereby completing a replication cycle. Traditionally, each source site cannot send a subsequent snapshot until the completion of a replication cycle.

Conventionally, in asynchronous replication, there may be a lag between when, for example, a storage application at a source site sends a snapshot via asynchronous replication to a target site and when the source site receives an acknowledgement of the processing of that snapshot at the target site. In some embodiments, the lag time or latency may be expressed any number of ways such as no more than a given period of time, a set amount of data (i.e., number of blocks), or a number of data transactions. A period of time may vary or may be a predetermined period of time selected though user configuration. Asynchronous replication is described in greater detail in U.S. patent application Ser. No. 15/086,577 entitled "METHOD AND SYSTEM FOR LEVERAGING SECONDARY STORAGE FOR PRIMARY STORAGE SNAPSHOTS" filed on Mar. 31, 2016, commonly assigned with the present application to EMC Corporation of Hopkinton, Mass., and incorporated herein by reference in its entirety.

In asynchronous replication, there may be a chance of data loss that may occur as the acknowledgement of receipt of a snapshot has been logged before the snapshot is actually written to storage at the target site. If there is a crash between the acknowledgement and when the snapshot is written, this data may be lost. In alternative embodiments, asynchronous replication may offer the ability to run the production site with little or no slowing due to data protection requirements. This may be because replication requirements, in terms of data needed to be replicated, may not be constant and may fluctuate. Asynchronous data replication may offer a buffer or lag which may buffer data replication, allowing it to build up during heavy replication periods and allowing it to catch up during lighter replication periods.

According to example embodiments of the present invention, asynchronous replication is achieved at the source by taking periodic snapshots and sending them to the target side. In certain embodiments the snaps are grouped into snap sets and form a hierarchy of snaps at the source, where the oldest snap is the base of the hierarchy and a cascading list of snapshots leads to the newest version (i.e., the actual volume in its present state). Accordingly, in example embodiments, delta sets may be calculated by comparing two generations of snaps which then may be sent as a delta set to the target. As described in greater detail below, such replication may be performed in a preferred embodiment on a block by block basis first by sending a short hash of the block and, if a match is found, a full hash is sent to validate it. Otherwise, the full block is sent.

Thus, in example embodiments, the target receives a delta set into a snap. The target side similarly maintains a hierarchy of linked snap sets, where the oldest one is the oldest consistent point-in-time available and the newest one is the point-in-time being built (not yet consistent). The source notifies the target when it finished sending all the data for a point-in-time (meaning that the snap set on the target should be consistent). The source also instructs the target to create a new snap set for the next cycle of data. It should be understood that the target side may merge older snaps to save space.

Hash-Based Replication

In a Content Addressable Storage (CAS) array, data is stored in blocks, for example of 4 KB, where each block has a unique large hash signature, for example of 20 bytes, saved on Flash memory. As described herein, hash signatures are accessed by small in-memory handles (Called herein short hash handles), for example of 5 bytes. These handles are unique to each array, but not necessarily unique across arrays. When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it is faster to send the data without a hash signature, and let the target calculate the hash signature).

While the short hash handles are readily available without the need to read from Flash, since the short hash handles are not unique, they cannot be easily used to check if a target contains a hash signature. In some implementations, short hash handles are shortcuts for hash signatures, and can give a reliable hint of the existence of a hash signature in an array. More information regarding hash-based replication may be found in U.S. Pat. No. 9,378,106 entitled "HASH-BASED REPLICATION" issued on Jun. 28, 2016 and short hash handles are described in greater detail in U.S. Pat. No. 9,286,003 entitled "METHOD AND APPARATUS FOR CREATING A SHORT HASH HANDLE HIGHLY CORRELATED WITH A GLOBALLY-UNIQUE HASH SIGNATURE" issued on Mar. 15, 2016, both of which patents are commonly assigned with the present application to EMC Corporation of Hopkinton, Mass. and incorporated herein by reference in their entirety. While the description describes using this approach with de-duplication storage devices, it would be appreciated by one of ordinary skill in the art that the approach described herein may be used with any type of storage device including those that do not use de-duplication.

Automatic Replication Data Verification and Recovery

Snapshot-based asynchronous replication transfers data to replication targets in cycles, as described in U.S. patent application Ser. No. 14/755,384 entitled "ASYNCHRONOUS REPLICATION CYCLES" filed on Jul. 15, 2015 and incorporated by reference herein in its entirety. As described therein, during each replication cycle, a point-in-time (PIT) snapshot is created at the source and new data since the last replication cycle is transferred to the target site as part of the current replication cycle. Similarly, in each cycle, a PIT snapshot is created at the target to host the data delta coming from the source. A snapshot tree is organized such that data transferred in each cycle can be combined to present the exact same data content of each cycle as what is in the source. The differential cycle data transfer is very efficient in terms of sending data to a remote site, since we send only differences and not the full contents of the snapshot. One drawback though, is that data loss or corruption of earlier cycle snap nodes can be silently populated to its children.

For data consistency and integrity, traditional existing approaches rely on end to end block data verification built in a replication data path. This approach works well to capture data corruption within a data block, or during a single transfer. However, it cannot detect data written to the wrong location, or lost writes in target due to hardware, software, or communication failures. Given the differential data replication nature, data inconsistency in one ancestor snapshot volume could propagate to all its snapshot descendants and remain undetected until the time of disaster recovery. The potential data inconsistency of previous snapshots complicates and lengthens the entire process of disaster recovery. In many cases, an administrator has to manually verify snapshots using host based tools before using them to reactivate replication after disaster recovery.

As will be described in greater detail below, example embodiments of the present invention overcome these and other drawbacks by introducing background data verification and signing of replication snapshots. In certain embodiments, this allows for early data inconsistency detection between the source and target data storage systems and improves reliability of the data integrity and recovery time objective (RTO) after disaster recovery. Furthermore, such verification may minimize manual operations required during and after disaster recovery, and may automatically reactivate asynchronous replication cycles based on a best snapshot pairs available in the system 100, where a snapshot pair is a pair of synchronized snapshots in the source and target data storage systems (i.e., snapshots that were verified to contain the same data).

FIG. 1 is a block diagram illustrating a system 100 for performing asynchronous replication data verification according to an example embodiment of the present invention. As illustrated in FIG. 1, the system 100 includes a source data storage system 110 and a target data storage system 120. The source node 110 may receive input/output (I/O) operations performed by a host 105 and may operate a storage application 107. The I/O operations may be performed on a storage volume 120 that may be represented by the storage application 107 as a set of snapshots $130_{1-N}$ (130 generally) as described above. The target node 160 includes a snapshot manager 150 which may manage a plurality of replicated snapshots $180_{1-N}$ (180 generally) according to a policy 165. As changes are made to the storage volume 120 via I/O operations from the host 105, the storage application 107 may perform asynchronous replication 151 from the source node 110 to the target node 160.

Figure 2:
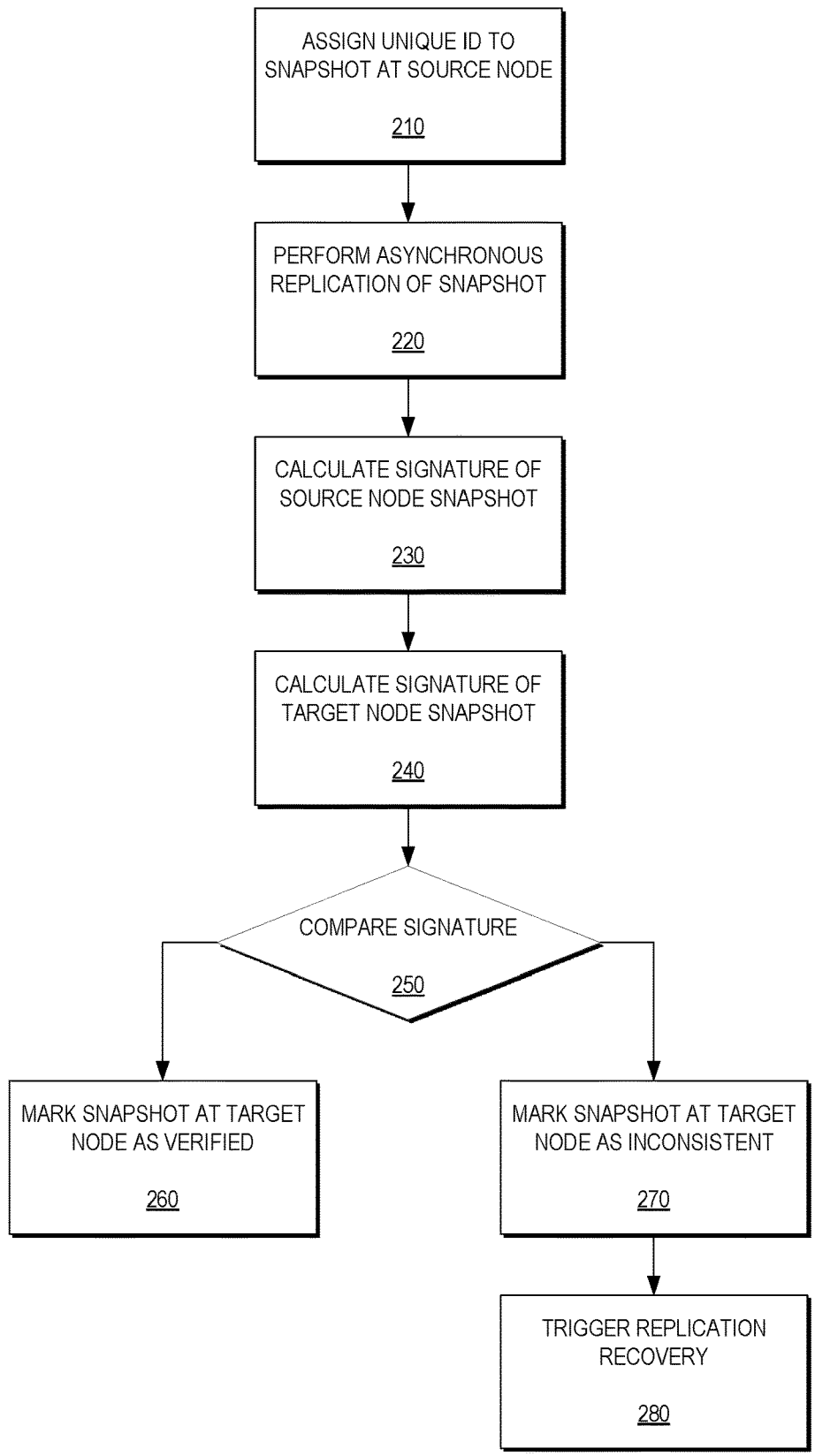
FIG. 2 is a flow diagram illustrating a method for performing asynchronous replication data verification according to an example embodiment of the present invention.

FIG. 2 is a flow diagram illustrating a method for performing asynchronous replication data verification according to an example embodiment of the present invention. As illustrated in FIG. 2, the storage application 107 may initiate an asynchronous replication cycle of a snapshot 130 from the source node 110 to the target node 160. Accordingly, example embodiments of the present invention may assign a unique identifier to the snapshot 130 at a source node 110 in a data storage system 100 (210). For example, the storage application 107 may assign a global unique identifier (GUID) unique across all nodes of the data storage system 100 to the snapshot 130, with the GUID persisted in metadata for the snapshot 130 at the source node 110 and for the snapshot 180 at the target node 160.

Asynchronous replication 151 of the snapshot 130, including the unique identifier, then may be performed from the source node 110 to the target node 160 (220). Following the asynchronous replication cycle 151, the pair of snapshots 130, 180 is marked as synchronized and becomes a potential candidate for future recovery and replication reactivation. As will be described in greater detail below, the unique identifier (e.g., GUID) may be used to identify replicated snapshot pairs to verify replication data during, for example, recovery.

Integrity of the replicated snapshot 180 may be verified at the target node 160. For example, following the completion of a currently asynchronous replication cycle, the snapshot manager 150 may perform verification of the integrity of the replicated snapshot 180. First, the target node snapshot manager 150 may cause the source node storage application 107 to calculate a first signature indicative of the data of the snapshot 130 at the source node 110 (230) and calculate a second signature indicative of the data of the snapshot 180 at the target node 160 (240).

In certain embodiments, a background data verification thread may calculate a signature from various data sources. For example, in some embodiments, the snapshot manager 150 may scan through synchronized snapshots and calculate a whole volume data signature from on-disk data (e.g., per 8k block), which although it may provide the strongest verification also requires the most computational resources. Other example embodiments may calculate the signature as a hash of hashes (e.g. per 160b hash) of each page in the snapshot, which is less computationally intensive than hashing over the data, itself, and provides a similar level of verification confidence. Yet other example embodiments may calculate the signature as a hash of short hash handles (e.g., per 32b short hash handle) which is both computationally cheap and fast. Further, advantageously, in example embodiments of the present invention, signatures of portions of the disk data and the short hash handles are data structures in memory in the data storage system which enables improved performance.

The snapshot manager 150 then may compare the first signature calculated at the source node 110 and the second signature calculated at the target node 160 to identify a difference, if any, between the first and second signatures (250). Accordingly, each pair of snapshots 130, 180 may have a consistency attribute, such as synched (but not verified), verified, or inconsistent.

If the first signature calculated at the source node 110 and the second signature calculated at the target node 160 are consistent, the snapshot data consistency is verified and the snapshot manager 150 may mark the snapshot 180 at the target node 160 as verified (260). Further, a whole volume data signature may be persisted to perform single side data verification in the future.

However, if the first signature calculated at the source node 110 and the second signature calculated at the target node 160 are inconsistent (253), an inconsistency is determined and the snapshot manager 150 may mark the snapshot 180 at the target node 160 as inconsistent (270) and trigger replication recovery (280) in the data storage system 100. To perform replication recovery, the snapshot manager 150 may drop the failed snapshot 180 from a list of consistent snapshot at the target node 160 or perform a full synchronization cycle to correct the data inconsistency. Thus, in order to perform replication recovery after, for example, a disaster, example embodiments of the present invention may select a snapshot for recovery from the list of snapshots at the target having respective verification statuses depending on a risk tolerance as determined by a policy (e.g., the snapshot manager 150 may select a synchronized but unverified pair of snapshots 130, 180 if risk tolerance is high or a verified pair of snapshots 130, 180 if risk tolerance is low).

Figure 3:
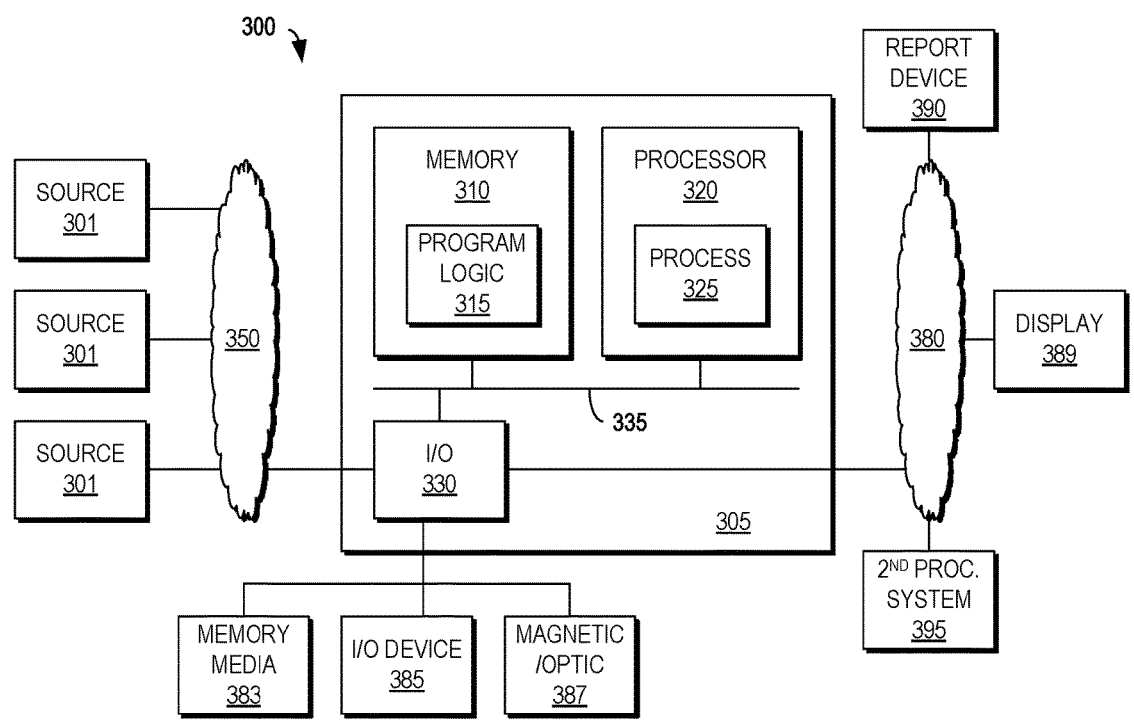
FIG. 3 is a block diagram illustrating an apparatus according to an example embodiment of the present invention.

FIG. 3 is a block diagram of an example embodiment apparatus 305 according to the present invention. The apparatus 305 may be part of a system 300 and includes memory 310 storing program logic 315, a processor 320 for executing a process 325, and a communications I/O interface 330, connected via a bus 335. The apparatus 305 is configured to communicate with memory media 383, I/O devices 385, and magnetic or optical (magnetic/optic) drives 387 via the communications I/O interface 330. The apparatus 305 is configured to communicate with a plurality of sources 301 via a network 350 using communications I/O interface 330. The apparatus 305 is further configured to communicate with a display 389, a report device 390, and a second processing system 395 via a network 380 using communications I/O interface 330. The exemplary apparatus 305 is discussed only for illustrative purpose and should not be construed as a limitation on the embodiments or scope of the present disclosure. In some cases, some devices may be added to or removed from a computer system based on specific situations. For example, a computer system may be representative of a standalone system or a system of a production site, which comprises a number of hosts coupled to a source disk and a target disk. In most embodiments, a system/device may comprise a processor and a memory, such as a laptop computer, personal digital assistant, or mobile phones.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

In some embodiments, the system may be performed by one or more programmable processors executing one or more computer programs to perform the functions of the system. In some other embodiments, all or part of the system may be implemented as special purpose logic circuitry (e.g., a field-programmable gate array (FPGA) and/or an application-specific integrated circuit (ASIC)). In some other embodiments, all or part of the system may be implemented using electronic hardware circuitry that include electronic devices such as, for example, at least one of a processor, a memory, a programmable logic device or a logic gate.

In one embodiment, the methods described herein are not limited to the specific examples described. In a further embodiment, rather, any of the method steps may be re-ordered, combined or removed, or performed in parallel or in serial, as necessary, to achieve the results set forth above.

In some embodiments, the system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). In certain embodiments, each such program may be implemented in a high level procedural or object-oriented programming language to communicate with a computer system. In certain other embodiments, however, the programs may be implemented in assembly or machine language. In some embodiments, the language may be a compiled or an interpreted language and it may be deployed in any form, including as a stand-alone program or as a module, component, subroutine, or other unit suitable for use in a computing environment. In some other embodiments, a computer program may be deployed to be executed on one computer or on multiple computers at one site or distributed across multiple sites and interconnected by a communication network.

Figure 4:
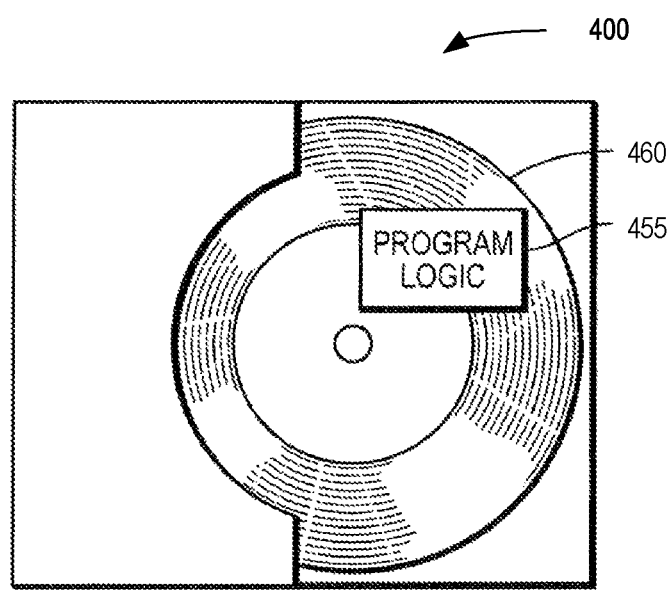
FIG. 4 is an illustration of an example embodiment of the present invention as embodied in computer program code

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 3, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine. In some other embodiment, a non-transitory machine-readable medium may include but is not limited to a hard drive, compact disc, flash memory, non-volatile memory, volatile memory, magnetic diskette and so forth but does not include a transitory signal per se. FIG. 4 is a block diagram of a computer program product 400 including program logic 455, encoded on a computer-readable medium 460 in computer-executable code configured for carrying out the methods of the invention, according to an example embodiment of the present invention. The logic for carrying out the method may be embodied as part of the aforementioned system, which is useful for carrying out a method described with reference to embodiments shown. In one embodiment, program logic 455 may be loaded into memory and executed by processor. In a further embodiment, program logic 455 may also be the same program logic 455 on a computer readable medium.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

Hereinafter, various exemplary embodiments of the present disclosure have been described with reference to the accompanying drawings. It should be noted that all of these drawings and descriptions are only presented as exemplary embodiments. It is to be noted that based on the subsequent description, alternative embodiments may be conceived that may have a structure and method disclosed as herein, and such alternative embodiments may be used without departing from the principle of the disclosure as claimed in the present disclosure.

It may be appreciated that these exemplary embodiments are provided only for enabling those skilled in the art to better understand and then further implement the present disclosure, not intended to limit the scope of the present disclosure in any manner. Besides, in the drawings, for a purpose of illustration, optional steps, modules, and units are illustrated in dotted-line blocks.

The terms "comprise(s)," "include(s)", their derivatives and like expressions used herein should be understood to be open, i.e., "comprising/including, but not limited to." The term "based on" means "at least in part based on." The term "one embodiment" means "at least one embodiment"; and the term "another embodiment" indicates "at least one further embodiment." Relevant definitions of other terms will be provided in the description below.

It may be noted that the flowcharts and block diagrams in the figures may illustrate the apparatus, method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

What is claimed is:

1. A method comprising:
   assigning a unique identifier to a snapshot at a source node in a data storage system;
   performing asynchronous replication of the snapshot, including the unique identifier, from the source node to a target node;
   performing integrity verification on the replicated snapshot having the unique identifier at the target node to determine whether or not the replicated snapshot matches the snapshot having the unique identifier at the source node;
   setting a first consistency attribute associated with the replicated snapshot to a first value responsive to the integrity verification indicating that the replicated snapshot does not match the snapshot having the unique identifier at the source node;
   triggering a replication recovery in response to the first consistency attribute associated with the replication snapshot having the first value;
   selecting a replication recovery snapshot from a list of candidate snapshots, a second consistency attribute associated with the selected replication recovery snapshot having a second value different from the first value, wherein the first value indicates an inconsistent verification status and the second value indicates one of a verified verification status and a synchronized but not yet verified verification status; and
   performing replication recovery according to the selected replication recovery snapshot.

2. The method of claim 1
   wherein the data storage system comprises a plurality of nodes; and
   wherein the unique identifier is a globally unique identifier unique across all nodes of the data storage system.

3. The method of claim 2 wherein performing integrity verification on the replicated snapshot having the unique identifier at the target node comprises:
   calculating a first signature indicative of the data of the snapshot at the source node in the data storage system;

calculating a second signature indicative of the data of the snapshot at the target node in the data storage system; and comparing the first signature calculated at the source node and the second signature calculated at the target node to identify a difference, if any, between the first and second signatures.

4. The method of claim 1 further comprising performing the integrity verification on the replication recovery snapshot by:

calculating a first signature indicative of the data of a source snapshot corresponding to the replication recovery snapshot in the data storage system;

calculating a second signature indicative of the data of the replication recovery snapshot in the data storage system;

comparing the first signature and the second signature to identify a difference, if any, between the first and second signatures; and responsive to the first signature and the second signature matching, setting the second consistency attribute associated with the selected replication recovery snapshot to the second value to indicate that the selected replication recovery snapshot has been verified.

5. The method of claim 3 wherein one or more of calculating a first signature indicative of the data of the snapshot at the source node in the data storage system and calculating a second signature indicative of the data of the snapshot at the target node in the data storage system comprises calculating the signature according to a value selected from a group consisting of:

disk data;
a plurality of signatures of portions of the disk data; and
a plurality of short hash handles.

6. The method of claim 5 wherein the plurality of signatures of portions of the disk data and the plurality of short hash handles are stored in memory in the data storage system.

7. The method of claim 3 wherein the triggering of the replication recovery is performed responsive to the first signature calculated at the source node and the second signature calculated at the target node not matching.

8. The method of claim 1 wherein performing replication recovery according to a selected replication recovery snapshot comprises selecting the replication recovery snapshot from the list of candidate snapshots according to the value of the second consistency attribute and a replication recovery policy associated with the data storage system.

9. The method of claim 3 wherein performing the integrity verification on the replicated snapshot having the unique identifier at the target node comprises performing the integrity verification on the replicated snapshot as a background process of the data storage system.

10. A data storage system comprising:
a source node;
a target node;
one or more processors; and
memory storing computer program code that when executed on the one or more processors performs the operations of:
assigning a unique identifier to a snapshot at a source node in a data storage system;
performing asynchronous replication of the snapshot, including the unique identifier, from the source node to a target node;
performing integrity verification on the replicated snapshot having the unique identifier at the target node to determine whether or not the replicated snapshot matches the snapshot having the unique identifier at the source node;

setting a first consistency attribute associated with the replicated snapshot to a first value responsive to the integrity verification indicating that the replicated snapshot does not match the snapshot having the unique identifier at the source node;

triggering a replication recovery in response to the first consistency attribute associated with the replication snapshot having the first value;

selecting a replication recovery snapshot from a list of candidate snapshots, a second consistency attribute associated with the selected replication recovery snapshot having a second value different from the first value, wherein the first value indicates an inconsistent verification status and the second value indicates one of a verified verification status and a synchronized but not yet verified verification status; and performing replication recovery according to the selected replication recovery snapshot.

11. The system of claim 10
wherein the data storage system comprises a plurality of nodes; and
wherein the unique identifier is a globally unique identifier unique across all nodes of the data storage system.

12. The system of claim 11 wherein performing integrity verification on the replicated snapshot having the unique identifier at the target node comprises:

calculating a first signature indicative of the data of the snapshot at the source node in the data storage system;

calculating a second signature indicative of the data of the snapshot at the target node in the data storage system; and comparing the first signature calculated at the source node and the second signature calculated at the target node to identify a difference, if any, between the first and second signatures.

13. The system of claim 12 further comprising performing integrity verification on the replication recovery snapshot by:

calculating a first signature indicative of the data of a source snapshot corresponding to the replication recovery snapshot in the data storage system;

calculating a second signature indicative of the data of the replication recovery snapshot in the data storage system;

comparing the first signature and the second signature to identify a difference, if any, between the first and second signatures; and responsive to the first signature and the second signature matching, setting the second consistency attribute associated with the selected replication recovery snapshot to the second value to indicate that the selected replication recovery snapshot has been verified.

14. The system of claim 12 wherein one or more of calculating a first signature indicative of the data of the snapshot at the source node in the data storage system and calculating a second signature indicative of the data of the snapshot at the target node in the data storage system comprises calculating the signature according to a value selected from a group consisting of:

disk data;
a plurality of signatures of portions of the disk data; and
a plurality of short hash handles.

15. The system of claim 14 wherein the plurality of signatures of portions of the disk data and the plurality of short hash handles are stored in memory in the data storage system.

16. The system of claim 12 wherein the triggering of the replication recovery is performed responsive to the first signature calculated at the source node and the second signature calculated at the target node not matching.

17. The system of claim 10 wherein performing replication recovery according to a selected replication recovery snapshot comprises selecting the replication recovery snapshot from the list of candidate snapshots according to the value of the second consistency attribute and a replication recovery policy associated with the data storage system.

18. The system of claim 12 wherein performing the integrity verification on the replicated snapshot having the unique identifier at the target node comprises performing the integrity verification on the replicated snapshot as a background process of the data storage system.

19. A computer program product including a non-transitory computer readable storage medium having computer program code encoded there on that when executed on a processor of a computer causes the computer to verify integrity of snapshots, comprising:
   computer program code for assigning a unique identifier to a snapshot at a source node in a data storage system;
   computer program code for performing asynchronous replication of the snapshot, including the unique identifier, from the source node to a target node;
   computer program code for performing integrity verification on the replicated snapshot having the unique identifier at the target node to determine whether or not the replicated snapshot matches the snapshot having the unique identifier at the source node;
   computer program code for setting a first consistency attribute associated with the replicated snapshot to a first value responsive to the integrity verification indicating that the replicated snapshot does not match the snapshot having the unique identifier at the source node;
   computer program code for triggering a replication recovery in response to the first consistency attribute associated with the replication snapshot having the first value;
   computer program code for selecting a replication recovery snapshot from a list of candidate snapshots, a second consistency attribute associated with the selected replication recovery snapshot having a second value different from the first value, wherein the first value indicates an inconsistent verification status and the second value indicates one of a verified verification status and a synchronized but not yet verified verification status; and
   computer program code for performing replication recovery according to the selected replication recovery snapshot.

20. The computer program product of claim 19 further comprising performing the integrity verification on the replication recovery snapshot by:
   calculating a first signature indicative of the data of a source snapshot corresponding to the replication recovery snapshot in the data storage system;
   calculating a second signature indicative of the data of the replication recovery snapshot in the data storage system;
   comparing the first signature and the second signature to identify a difference, if any, between the first and second signatures; and
   responsive to the first signature and the second signature matching, setting the second consistency attribute associated with the selected replication recovery snapshot to the second value to indicate that the selected replication recovery snapshot has been verified.

21. The computer program product of claim 19 wherein performing replication recovery according to a selected replication recovery snapshot comprises selecting the replication recovery snapshot from the list of candidate snapshots according to the value of the second consistency attribute and a replication recovery policy associated with the data storage system.

* * * * *